US010417279B1

(12) United States Patent
Beech (10) Patent No.: US 10,417,279 B1
(45) Date of Patent: Sep. 17, 2019

(54) CUSTOMIZED CROSS FADES FOR CONTINUOUS AND SEAMLESS PLAYBACK (71) Applicant: Amazon Technologies, Inc., Seattle, WA (US)

(72) Inventor: Jonathan Beech, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 722 days.

(21) Appl. No.: 14/961,598

(22) Filed: Dec. 7, 2015

(51) Int. Cl.
G06F 16/68 (2019.01)
G06F 16/683 (2019.01)
H04L 29/06 (2006.01)
G06F 3/0484 (2013.01)
G06F 3/0482 (2013.01)
G06F 16/638 (2019.01)

(52) U.S. Cl.
CPC .......... G06F 16/685 (2019.01); G06F 3/0482 (2013.01); G06F 3/04842 (2013.01); G06F 16/639 (2019.01); H04L 65/60 (2013.01)

(58) Field of Classification Search
CPC . G10H 2210/125; G10H 7/008; G11B 27/038
See application file for complete search history.

(56) References Cited

U.S. PATENT DOCUMENTS

| 2006/0271372 | A1* | 11/2006 | Escott | G11B 27/038 704/278 |
| 2008/0289479 | A1* | 11/2008 | Matsuhashi | G10L 19/00 84/604 |
| 2011/0100197 | A1* | 5/2011 | Rechsteiner | G10H 1/0041 84/609 |
| 2014/0018947 | A1* | 1/2014 | Ales | G11B 20/10 700/94 |
| 2014/0288686 | A1* | 9/2014 | Sant | G11B 27/038 700/94 |
| 2014/0355789 | A1* | 12/2014 | Bohrarper | H04R 3/00 381/119 |
| 2017/0056772 | A1* | 3/2017 | Eng | A63F 13/54 |

* cited by examiner

Primary Examiner — Justin S Lee
(74) Attorney, Agent, or Firm — Kilpatrick Townsend & Stockton LLP (57) ABSTRACT Systems and methods are provided for curating playlists of content for provisioning and presenting to users a seamless cross fade experience from one piece of content to the next within the playlist. In embodiments, information that identifies portions of content without audio or video data may be maintained. Further, metadata may be generated that identifies a cross fade points for the content in response to receiving input from a user device of a user. In an embodiment, each cross fade point may identify a time window of the content for interleaving with other content. In accordance with at least one embodiment, the metadata may be transmitted based at least in part on a selection of the metadata for the content.

19 Claims, 8 Drawing Sheets

CUSTOMIZED CROSS FADES FOR CONTINUOUS AND SEAMLESS PLAYBACK

Online media content providers have provided access to a plurality of content pieces such as songs, videos, and playlists that comprise multiple songs or videos grouped together in a large file. Currently, users who download and share content also enjoy generating new content such as playlists or mixes with their own unique take. Each playlist may be carefully curated by a user to communicate a certain mood, feel, or theme. However, problems may occur when attempting to share the carefully curated playlists. For example, other users who wish to access the playlist may have to download or stream a large file not only for a singular playlist but also every time they want a new interpretation or mix of the same playlist of content. Online media content providers lack the tools to allow users to efficiently share mixes or playlists of content with other users or disseminate information about the playlists of content.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include systems and methods for providing a content curation service that offers selections of playlist and/or mixes of content and metadata for implementing crossfade transitions during playback of the content. In accordance with at least one embodiment, the content curation service may maintain lyrics data or audio information that identifies time encoding information, time windows, or time periods that correspond to the presence of lyrics or other types of audio during playback of a song. In embodiments, the content curation service may maintain the time encoding information, time windows, or time periods for audio content or video content associated with the content curation service that indicates the presence of particular types of audio or video data of the content presented during playback. In embodiments, the content curation service may leverage the audio information to generate metadata that identifies crossfade points within the playlist of content for implementing seamless crossfade transitions. In some embodiments, the content curation service may leverage the audio information to generate metadata that identifies crossfade points for a plurality of songs included in an audio stream station. For example, the content curation service may utilize the audio information and other information that identifies a portion of upcoming tracks to identify potential crossfade transition points for seamless playback and transitioning between tracks as they are presented by an audio streaming station.

By utilizing the audio information the content curation service can avoid creating crossfade points that would result in disruptive or non-pleasing crossfade transitions during playback of the content. For example, the generated metadata may define a plurality of crossfade points for a song that only occur when no lyrics are presented in the song according to the audio information. This can ensure that if the song were to be transitioned via a crossfade for another song that a disruptive lyric interrupting transition would not occur. As used herein a crossfade transition includes a smooth transition from one piece of content to another. For example, in embodiments directed to songs, a crossfade transition between two songs can include decreasing the volume of the first song as the volume of the second song is increased. The crossfade points described herein can be utilized to define a point in a piece of content where a crossfade transition can begin or end. In accordance with at least one embodiment, the content curation service may generate metadata for playlists based on input received from users. The input may define one or more crossfade points for each piece of content in a playlist or mix thereby creating their own unique interpretation of the playlist.

In embodiments, the metadata may be utilized by a user device or a playback application to remove certain content and/or rearrange content. In accordance with at least one embodiment, the content curation service can verify the metadata generated based on the user input by utilizing the audio information to ensure that the crossfade points defined by the user do not lead to disruptive content interrupting transitions between content pieces of a playlist. In embodiments, the content curation service can offer or provide the metadata generated by the service or by users to other users associated with the content curation service for the proliferation of different interpretations or mixes of playlists of content. By offering the metadata separate from the playlist itself the content curation service provides a benefit for users reducing the network traffic required for accessing new interpretations of content and avoiding the retransmission of the same data files of a playlist. For example, the metadata files can be smaller and easier to transmit to user devices rather than transmitting a reassembled playlist that incorporates the metadata transitions each time the user wants to access a different mix or playlist interpretation. In embodiments, the crossfade points generated by the service or the users may provide the user with a better listening experience that includes access to more content within a limited time.

For example, current content playlist providers usually utilize transitions between content pieces that fail to account for dead air or periods of time where no content is presented thus extending the period of time between when content can be presented to a user.

In a non-limiting example, a computer that implements the content curation service described herein, may maintain lyrics data that indicates the presence of audio for a plurality of songs offered by the content curation service. A user may select, via a user interface presented on a user device, a particular playlist comprising twenty songs for download from the content curation service. The user may also provide input, via the user interface, for selecting crossfade metadata from a plurality of metadata options. The metadata may be transmitted to the user device that can be utilized to implement smooth crossfade transitions between the songs of the playlist as the user listens to the songs on the user device. The content curation service may also provide multiple metadata options for the playlist of twenty songs that can be selected by the user for download. At a later time, the user may select a different metadata crossfade option and be provided the metadata absent the re-transmission of the twenty songs. The new metadata option may be utilized by the user device to present the playlist of songs with different crossfade points and may rearrange the order or inclusion of songs included in the playlist that are different from the first metadata option downloaded.

Figure 1:
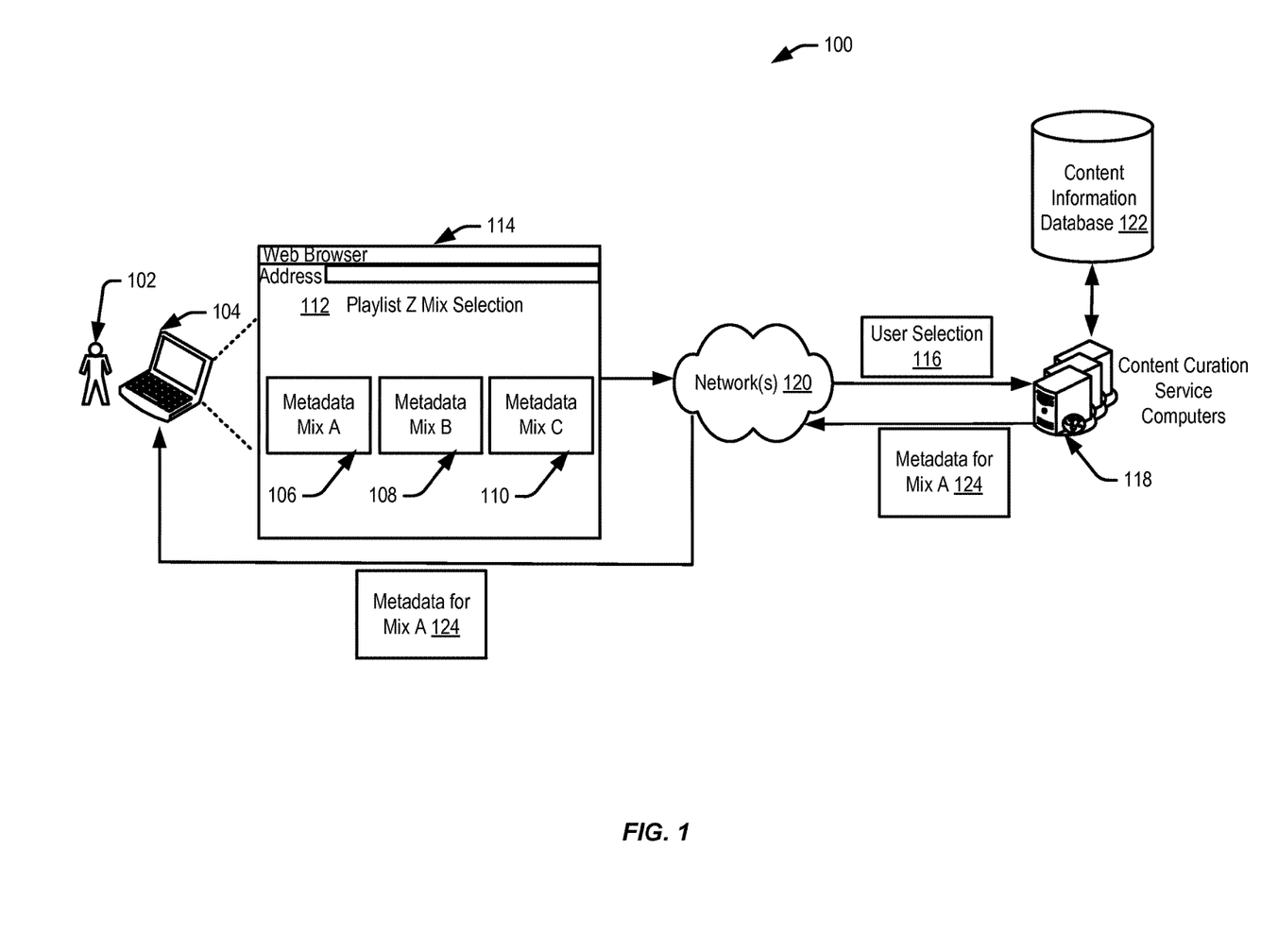
FIG. 1 illustrates an example workflow for providing a content curation feature described herein, in accordance with at least one embodiment.

FIG. 1 illustrates an example workflow for providing a content curation feature described herein, in accordance with at least one embodiment. The workflow 100 of FIG. 1 includes a user 102 utilizing a user device 104 browsing through one or more metadata mix options 106-110 for a particular playlist of content 112. The metadata mixes 106-110 and playlist of content 112 may be presented to the user 102 via a web browser interface 114 provided on the user device 104. It should be noted that although FIG. 1 depicts one playlist selection 112 and three metadata mix options 106-110, the content curation service described herein is capable of providing a plurality of playlists for selection and metadata mix options for further selection by the user 102. In accordance with at least one embodiment, the user 102 may have previously downloaded or obtained the playlist 112 of content for playback on the user device 104. In some examples, the user 102 may utilize the web browser interface 114 to select the playlist 112 and a metadata mix for download at the same time.

In accordance with at least one embodiment, the user 102 may provide input in the form of a user selection 116, via the user device 104, of the metadata mix 106. The user selection 116 may be provided to one or more content curation service computers 118 via available networks 120. In embodiments, the content curation service computers 118 may provide the web browser interface 114 that includes the playlist mix 112 and the various metadata mixes 106-110 via the networks 120. In embodiments, the content curation service computers 118 may maintain the lyrics data or audio information about the presence of lyrics in the songs of playlist 112 in a content information database 122. In some embodiments, the content curation service computers 118 may generate metadata 124 that corresponds to the selected metadata mix 106 in response to receiving the user selection 116. The content curation service computers may generate the metadata 124 by utilizing the audio information for the playlist 112 stored in database 122.

The metadata 124 may include one or more crossfade points that can be utilized by user device 104 to playback the playlist 112 with various crossfade transitions that are smooth and avoid disrupting any lyrics or important audio by utilizing the audio information for the songs of the playlist 112 to generate the metadata 124. In embodiments, the metadata 124 may be generated dynamically by the content curation service computers 118 in response to receiving the user selection 116 or the metadata 124 may be pre-generated by the content curation service computers 118 utilizing the audio information stored in content information database 122. In use cases where the user 102 has previously obtained or downloaded the playlist 112 of content, the content curation service computers 118 need only transmit the metadata 124 to the user device 104 as the metadata includes data that can be utilized by the user device 104 for implementing the appropriate crossfade transitions without requiring the user 102 download a reassembled playlist of content that adheres to the crossfade points indicated by metadata 124. Thus, the user 102 can obtain and enjoy multiple metadata mixes 106-110 quickly and without long transmission or download wait time.

Figure 2:
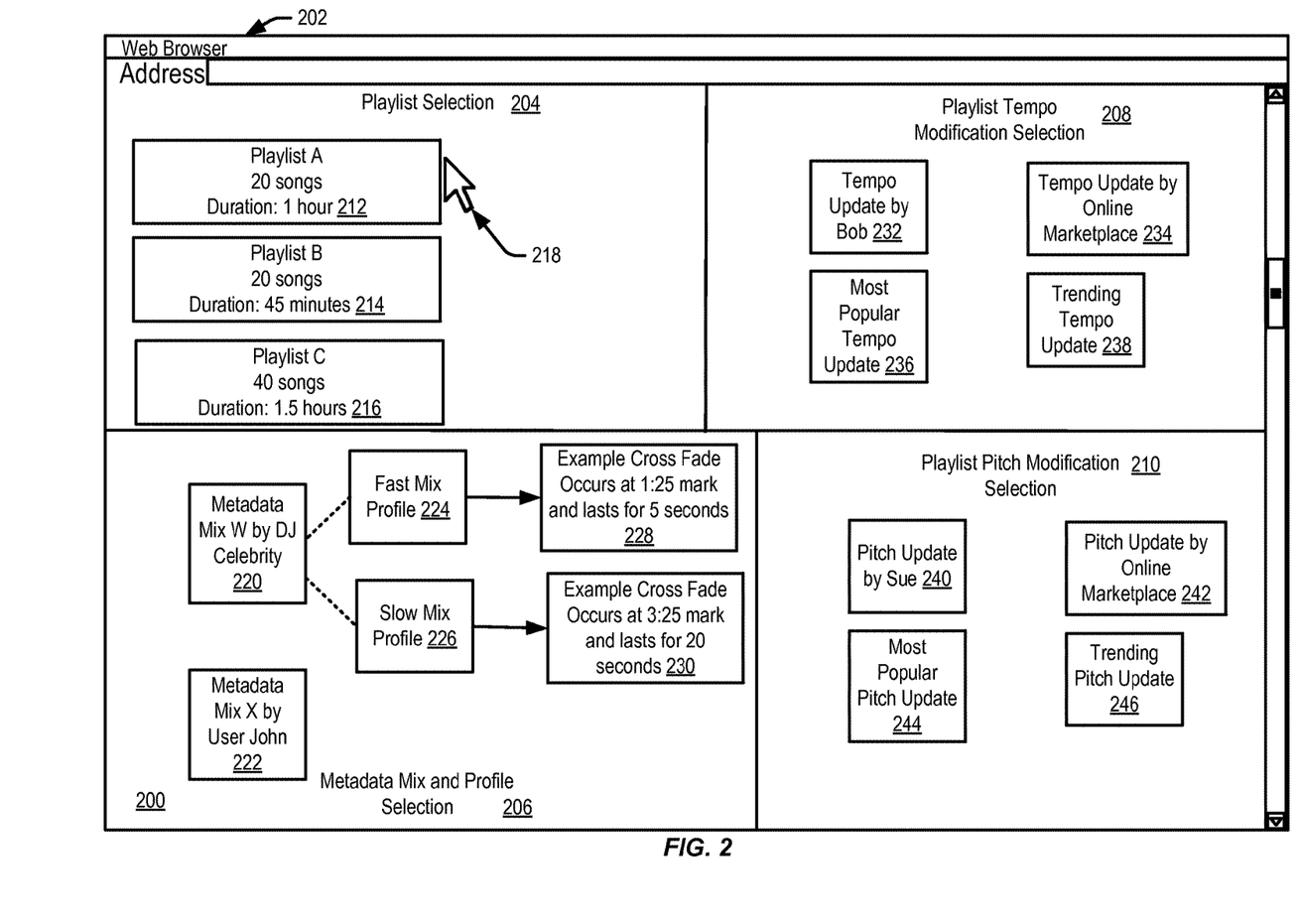
FIG. 2 illustrates an example user interface for content curation features described herein, in accordance with at least one embodiment.

FIG. 2 illustrates an example user interface 200 for content curation features described herein, in accordance with at least one embodiment. In embodiments, the user interface 200 may be presented via a web browser 202 to a user. In some embodiments, the user interface 200 may be presented via a native application of a user device associated with the user. The user interface 200 includes a playlist selection portion 204, a metadata mix and profile selection portion 206, a playlist tempo modification selection portion 208, and a playlist pitch modification selection portion 210. Although FIG. 2 depicts multiple portions 204-210 for presenting different content selection options for a user provided by the content curation service, the user interface 200 may include one portion or more portions for additional features described herein. The playlist selection portion 204 includes three playlist 212-216 offerings from the content curation service. Each playlist 212-216 offering may include additional information about the playlist of content. For example, playlist 212 titled "Playlist A" includes a description identifying that the playlist includes twenty songs and that the entire playlist's duration is one hour. In embodiments, a user may select a playlist, such as playlist A 212 utilizing an input device (mouse) 218 within user interface 200 to provide selection input.

The metadata mix and profile selection portion 206 may include one or more metadata mixes 220 and 222 as well as one or more mix profiles 224 and 226. The metadata mixes 220 and 222 may be generated by other users associated with the content curation service such as celebrities, DJs, or other users. For example, metadata mix W 220 includes a description of the author as DJ celebrity while metadata mix X 222 includes a description of the author as user John. As described herein, the metadata mixes 220 and 222 may be provided or transmitted to a user and utilized by a user device or playback application to implement crossfade transitions at particular time points and for particular durations as defined by the metadata for a playlist of content. The mix profiles 224 and 226 may be associated with a particular metadata mix (such as metadata mix 220) and include data for further modifying the crossfade metadata of a particular mix.

For example, the other of metadata mix W 220 may have provided input for generating multiple profiles for utilizing the crossfade points included in metadata mix W 220. FIG. 2 illustrates two example profiles such as fast mix profile 224 and slow mix profile 226 that may also be provided to a user upon selection of metadata mix W 220. Metadata mix and profile selection 206 includes a short description 228 and 230 of the mix profiles 224 and 226. For example, the description 228 identifies that cross fades may occur as soon as the 1:25 minute mark of a song and only last for five seconds, whereas the description 230 identifies that cross fades may occur as late as the 3:25 minute mark and last as long as twenty seconds. In embodiments, upon selecting a metadata mix 220 or 222 the user may be presented with an option to select a profile 224 or 226. In some embodiments, the content curation service computers may track the selections made by users and a returning user may at a later time select a particular mix profile 224 or 226 after having previously selected and downloaded metadata mix 220.

The playlist tempo modification selection portion 208 includes multiple tempo updates 232-238 for selection by a user. In accordance with at least one embodiment, the content curation service may receive input from a user to generate tempo information for a particular crossfade transition for content of a playlist. For example, the generated tempo information may further modify a crossfade transition of a crossfade metadata mix (220 or 222) by increasing or decreasing the tempo of the transitioning content. The tempo updates 232-238 may be separately provided to a user upon selection via the user interface 200 or a user may select a playlist, metadata mix, and tempo update to modify, by the content curation service computers, the metadata mix before transmission to the user. As depicted in FIG. 2, tempo updates 232-238 may be authored by users (232), by an entity associated with the content curation service or providing content for download (234), or generated by the content curation service utilizing aggregated user data selections such as most popular tempo updates 236 or trending tempo updates 238. The playlist pitch modification selection portion 210 may include similar options as those described above for tempo but for modifications to the pitch of content during crossfade transitions. The playlist pitch modification selection portion 210 depicted in FIG. 2 includes pitch updates 240-246 also authored by users (240), by an entity associated with the content curation service or providing content for download (242), or generated by the content curation service utilizing aggregated user data selections such as most popular tempo updates 244 or trending tempo updates 246. The pitch updates 240-246 may be separately provided to a user upon selection via the user interface 200 or a user may select a playlist, metadata mix, and pitch update to modify, by the content curation service computers, the metadata mix before transmission to the user. In accordance with at least one embodiment, information or data from a live performance by a DJ and associated hardware such as digital decks with corresponding midi/control output may be obtained by the content curation service computers or a user device. This live or performance information may be utilized to generate metadata, update metadata, or create tempo, pitch, gain, and volume information for further updating or changing metadata mixes for playlists of content. In some embodiments, audio sessions recorded and saved by software of a device associated with a DJ or other software applications may be stored in a musical instrument digital interface (MIDI) format. The stored MIDI files may be transmitted to the content curation service computers or user devices and identify fade, track automation (volume and pan), tempo, markers and cue points that could be utilized generate metadata for cross fade transitions or to modify existing metadata for cross fade transitions.

Figure 3:
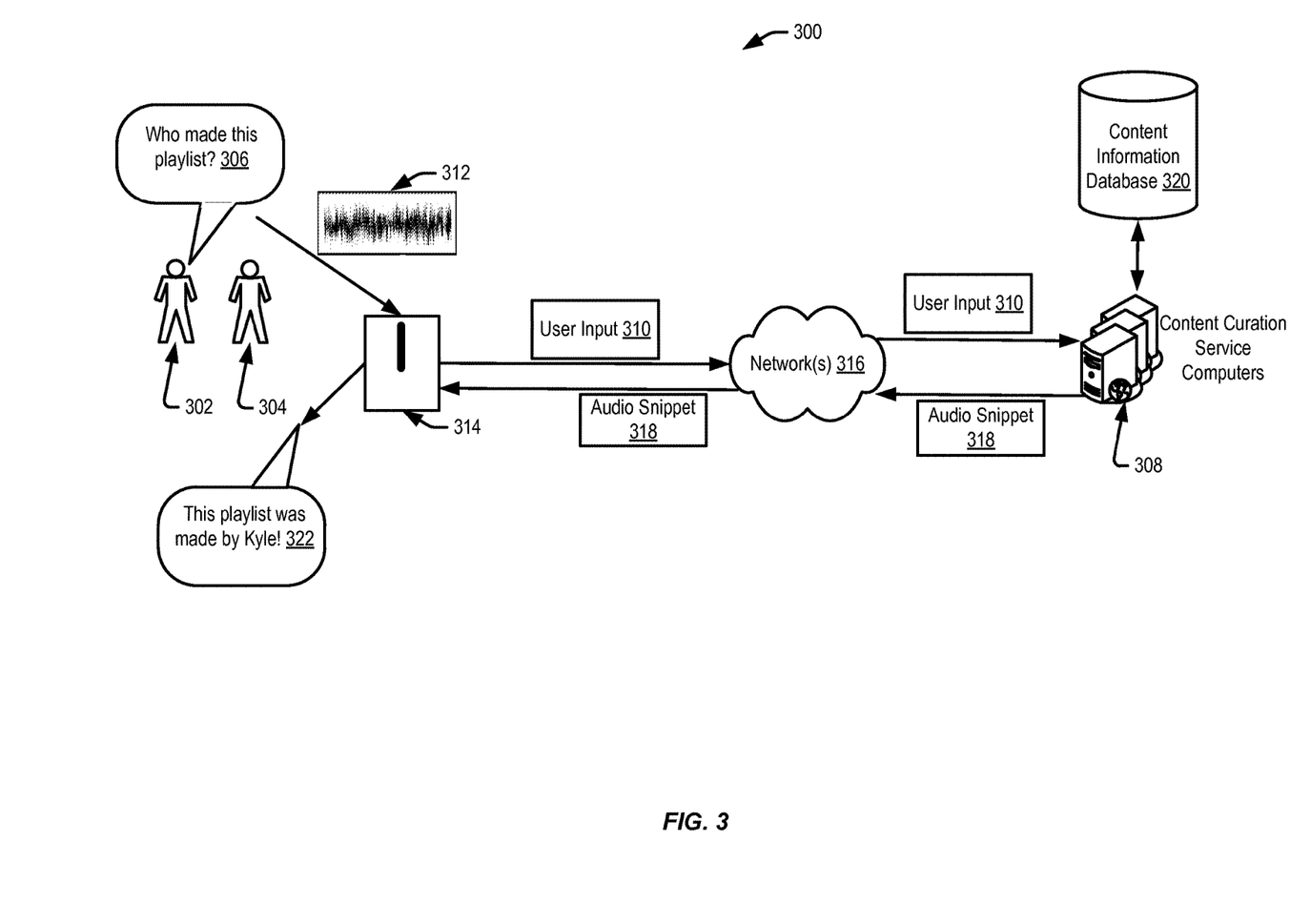
FIG. 3 illustrates an example workflow for providing a content curation features described herein, in accordance with at least one embodiment.

FIG. 3 illustrates an example workflow 300 for providing a content curation features described herein, in accordance with at least one embodiment. The workflow 300 includes users 302 and 304 conversing 306 about a playlist of music they are listening to. In accordance with at least one embodiment, the content curation service computers 308 may receive user input 310 derived from input 312 received by a user device 314 associated with users 302 and 304. For example, the input 312 may include audio input captured by user device 314 from the conversation 306 between users 302 and 304. The user device 314 may generate the user input 310 and provide it to the content curation service computers 308 via networks 316. In accordance with at least one embodiment, the content curation service computers 308 may generate an audio snippet 318 that can be utilized by the user device 314 to playback to the users 302 and 304 during an appropriate moment as determined by the audio information and metadata mix of the playlist the users 302 and 304 are listening to. In some embodiments, the content curation service computers 308 may generate other types of content including audio or video for interleaving at an appropriate time as determined by the audio information and metadata for presenting to a user. In embodiments, the audio snippet 318 may be configured for presentation in a station of content that is presented to users 302 and 304 by utilizing the audio information for the content or tracks included in the station of content.

In embodiments, the content curation service computers 308 may generate an appropriate audio snippet 318 based at least in part on the user input 310 and leveraging the audio input and metadata information stored in content information database 320. As used herein, an appropriate audio snippet 318 includes content that is relevant to the user input 310 received by the content curation service computers 308 and is of a duration that can be utilized by a playlist without disrupting the user's listening experience by leveraging the audio information and the mix metadata. For example, the audio snippet 318 may include a response to a question asked by users 302 and 304 about the playlist of songs they are listening to where the response is of a duration that can be seamlessly integrated into the playback of songs without interrupting the lyrics of the songs or the crossfade transitions. In an embodiment, the audio snippet 318 includes instructions for when to insert the audio snippet for the user device 314 interpretation and implementation. In some embodiments, the audio snippet 318 may be presented to the users 302 and 304 during a crossfade transition that consists of silence or lack of presentation of content.

The workflow 300 includes the user device 314 audibly presenting 322 the audio snippet 318 to the users 302 and 304 with a response to the query presented in their conversation 306. In accordance with at least one embodiment, the content curation service computers 308 may utilize the audio information, mix metadata, and other information about a user (such as information shared during a registration with the content curation service or provided by an online marketplace) to generate appropriate advertisements, recommendations, or reminders to be presented as audio snippets. The advertisements, recommendations, and reminders may be of an appropriate duration as determined by the content curation service computers utilizing the audio information and mix metadata for a playlist so as to not interrupt the presentation of content but to only be provided during silence or when no content is presented.

Figure 4:
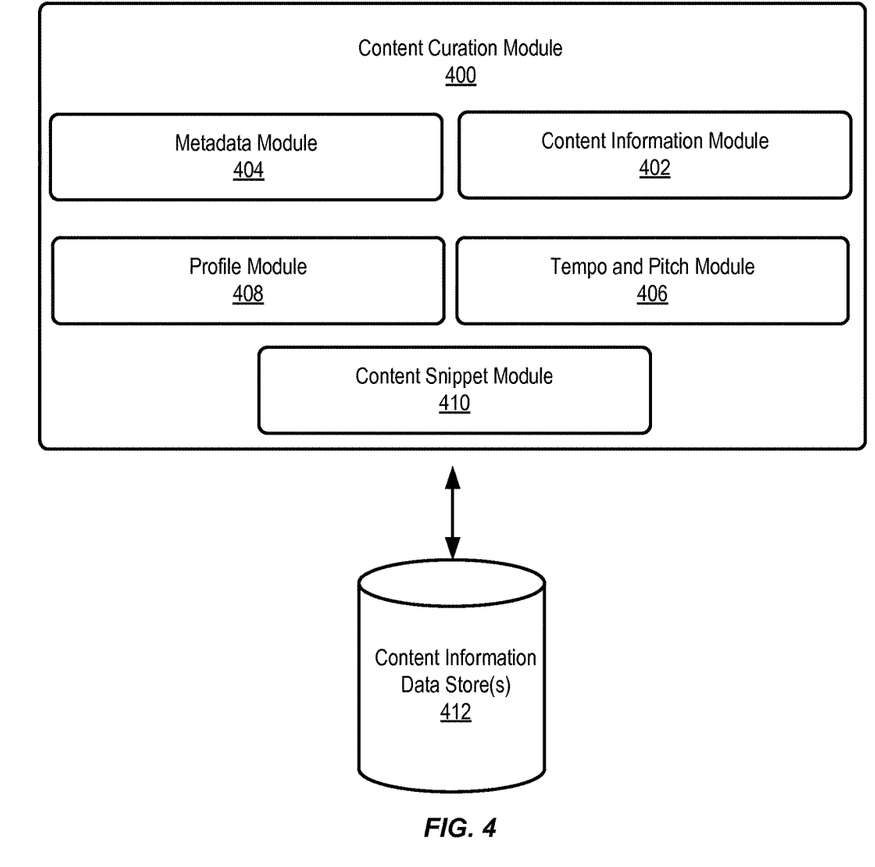
FIG. 4 illustrates a schematic diagram depicting aspects of a content curation module as described herein, in accordance with at least one embodiment.

FIG. 4 illustrates a schematic diagram depicting aspects of a content curation module as described herein, in accordance with at least one embodiment. In accordance with at least one embodiment, the content curation module 400 may include a content information module 402, a metadata module 404, a tempo and pitch module 406, a profile module 408, and a content snippet module 401 in communication with a content information data store 412. The modules included within and including content curation module 400 may be software modules, hardware modules, or a suitable combination thereof. If the modules are software modules, the modules can be embodied on a non-transitory computer readable medium and processed by a processor in any of the computer systems described herein. It should be noted that the described processes and architectures described herein can be performed either in real-time or in an asynchronous mode prior to user interaction. The modules may be configured in the manner suggested in FIG. 4 or may exist as separate modules.

In accordance with at least one embodiment, the content curation module 400 may be configured to maintain and update playlists of content offered by the content curation service or on behalf of third parties. The content curation module 400 may be configured to generate and provide a user interface for presenting the selection of playlists, metadata mixes, pitch and tempo updates, or other suitable information. The user interface may be configured for presentation via a web browser or a native software application of a user device. In embodiments, the content curation module 400 may be configured to receive and process selection input provided by a user via a user device and provide instructions for transmitting the appropriate data including playlists or metadata mixes to the user device. In accordance with at least one embodiment, the content curation module 400 may generate and provide instructions for proper interleaving and crossfade transitioning the content included in a playlist. The instructions may identify the use of one or more playback applications to implement the crossfade transition or the use of multiple audio channels to successfully and seamlessly crossfade transition between content pieces of a playlist. In embodiments, a playback application may be configured to utilize a plurality of audio streams or content streams for implementing a seamless crossfade transition between content pieces of a playlist or station.

In accordance with at least one embodiment, the content information module 402 may be configured to maintain and update the audio information (lyrics data) for content provided by the content curation service. The content information module 402 may identify a plurality of time windows for each piece of content where audio is absent, video is absent, or both are missing from the content during playback.

In accordance with at least one embodiment, the metadata module 404 may be configured to generate, either dynamically or pre-generated, metadata mixes for identifying one or more crossfade points that can be utilized for seamless crossfade transitioning of content included in a playlist or mix. In accordance with at least one embodiment, the metadata module 400 may be configured to verify metadata mixes are appropriate for a particular playlist or mix of content based at least in part on the audio information maintained by content information module 402. The metadata module 404 may verify that the generated crossfade points included in the metadata do not cause disruptive transitions when content is being presented.

In accordance with at least one embodiment, the tempo and pitch module 406 may be configured to receive and process input to generate tempo mix data and pitch mix data. The tempo and pitch module 406 may be configured to verify the tempo and mix data based on the audio information from content information module 402 similar to metadata module 404. In embodiments, the tempo and pitch module 406 may provide instructions to a user device for implementing the tempo and pitch updates included in the tempo and pitch mix data.

In accordance with at least one embodiment, the profile module 408 may be configured to maintain and generate metadata profiles for further modification of metadata mixes. The metadata profiles may identify or instruct the use of a particular combination of crossfade points identified in a metadata mix. The metadata profiles may be generated by the profile module 408 utilizing input from users, aggregate user data, or entity data as described herein.

In accordance with at least one embodiment, the content snippet module 410 may be configured to generate audio snippets or content based at least in part on user input. As described herein, the user input may be sensed or received by a user device and provided to the content snippet module 410 for generation of content. In embodiments, the content snippet module 410 may generate recommendations, advertisements, or reminders that are useful or relevant to a user based on information provided by an associated online marketplace or derived from user provided input during a registration process. In accordance with at least one embodiment, the content snippet module 410 may receive and process input from user devices to determine appropriate content for including in the audio snippet by utilizing voice recognition or a mapping procedure of input and likely responses. The content snippet module 410 may provide instructions to a user device for appropriate integration of the audio snippet or content into a playlist without disrupting the transitions or presentation of the content itself by utilizing the audio information from the content information module 402 and the mix metadata from the metadata module 404 about the playlist of content.

Figure 5:
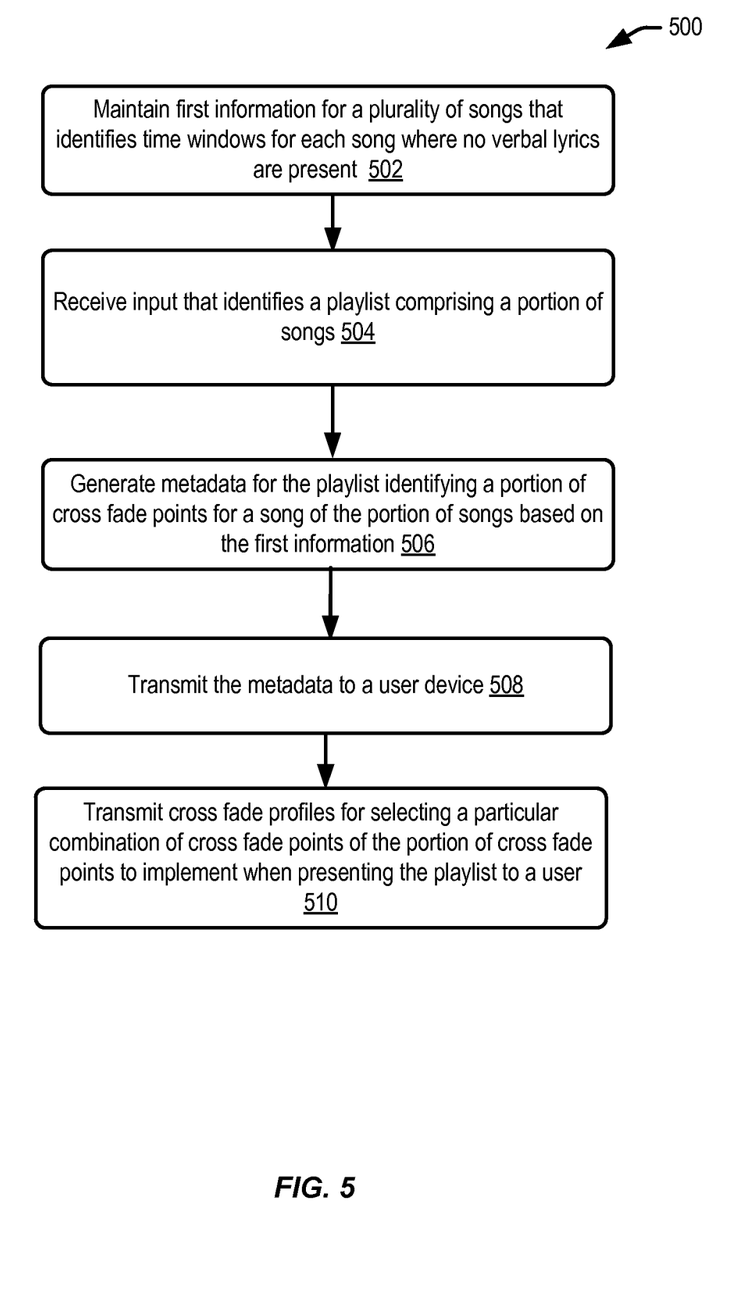
FIG. 5 illustrates an example flow diagram for a content curation feature described herein, in accordance with at least one embodiment.
Figure 6:
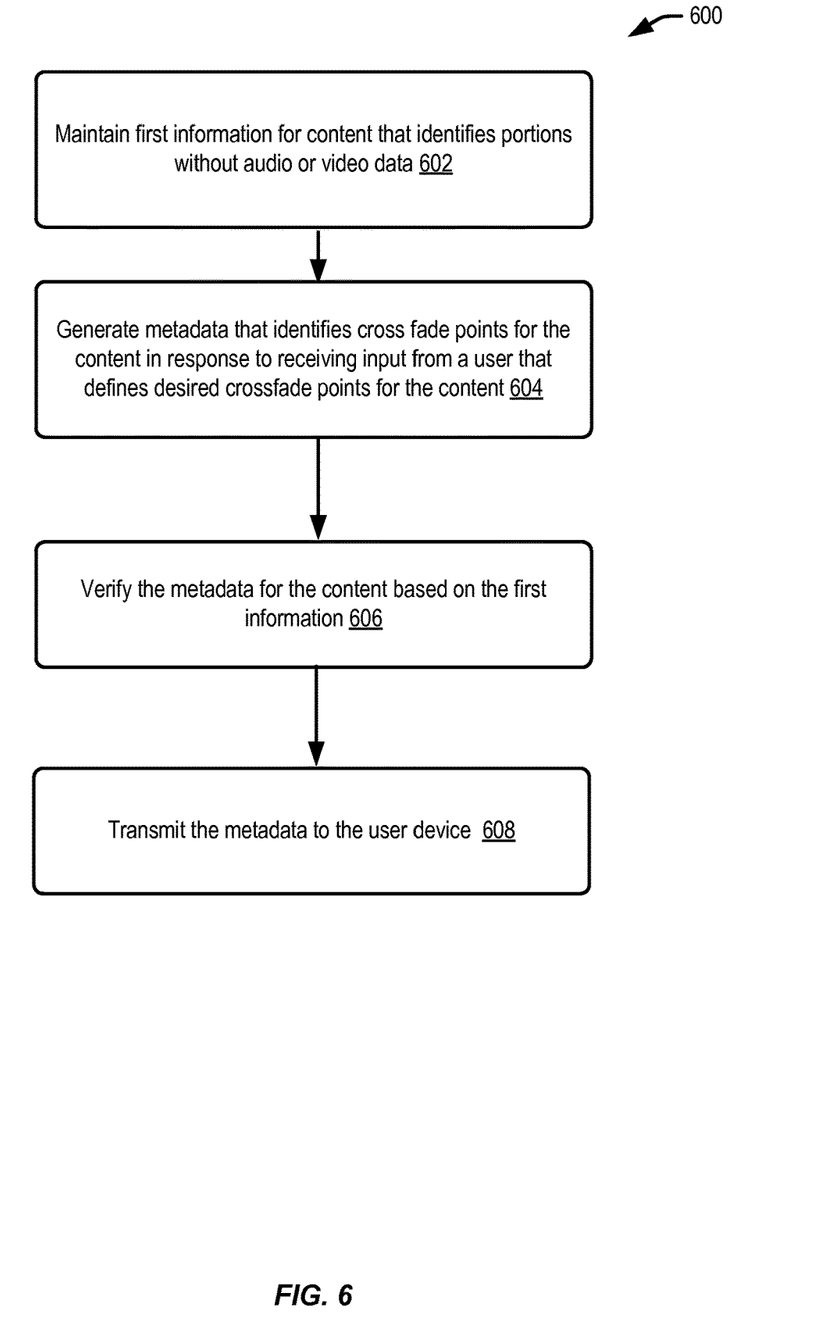
FIG. 6 illustrates an example flow diagram for a content curation feature described herein, in accordance with at least one embodiment.

FIGS. 5 and 6 illustrate example flow diagrams for a content curation feature described herein, in accordance with at least one embodiment. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any suitable number of the described operations can be combined in any suitable order and/or in parallel to implement the processes.

Additionally, some, any, or all of the processes (or any other suitable processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted herein, the code may be stored on a computer-readable storage medium, for example, in the form of a computer program including a plurality of instructions executable by one or more processors. The computer-readable storage medium may be non-transitory.

In some examples, one or more content curation service provider computers (e.g., utilizing at least one of a content curation module 400, a content information module 402, a metadata module 404, a tempo and pitch module 406, a profile module 408, and a content snippet module 410 in communication with one or more data stores 412) shown in FIG. 4 may perform the processes 500 and 600 of FIGS. 5 and 6. In FIG. 5, the process 500 may include maintaining first information for a plurality of songs that identifies time windows for each song where no verbal lyrics are present at 502. In some embodiments, the first information may identify time windows for each song where no audio or instrumentals are present. The process 500 may include receiving input that identifies a playlist comprising a portion of songs at 504. For example, the content curation service may provide a user interface presented in a native application of a user device or via a web page to the user for selecting a particular playlist of songs offered or provided by the content curation service.

In accordance with at least one embodiment, the process 500 may include generating metadata for the playlist that identifies a portion of cross fade points for each song based on the first information at 506. For example, the content curation service provider computers may dynamically generate and/or pre-generate the metadata for the playlist based on the first information. In some examples, the cross fade points start and end according to time encoding information included in the first information to avoid disrupting lyrics during cross fading on either the fading out song or the fading in song. In embodiments, the cross fade points may be configured for seamless playback between a first song and a second song of the playlist. The seamless playback may include fading out of the first song at a point where corresponding verbal lyrics are absent and fading in of the second song where the corresponding verbal lyrics are also absent. In some embodiments, a user or entity generating or curating the metadata may desire to create cross fade transitions that occur while particular types of audio (such as lyrics or instrumentals) are present. A user or entity may provide input which can be utilized to override rules or policies that generally prevent such disruptive transitions. Various combinations of cross fade transitions may be included in the embodiments described herein including transitions that interrupt vocals or other audio from a first song and transition into no audio or vocals from a second song, vice versa, or any other suitable combination of transitions that may create partially interrupted content. The process 500 may include transmitting the metadata to a user device of the user at 508. The process 500 may conclude at 510 by transmitting cross fade profiles for selecting a particular combination of cross fade points to implement when presenting the playlist to a user. For example, a certain profile may be utilized or selected by a user for further modification of the playlist and the crossfades. One profile may be an aggressive crossfade profile that defines shorter durations of cross fades while another profile may be a passive crossfade profile that defines longer durations of cross fades during playback by the user device.

In accordance with at least one embodiment, the process 600 may include maintaining first information for content that identifies portions without audio or video data at 602. In some embodiments, the content can include audio content or video content provided, offered, or shared by the content curation service provider computers. The process 600 may include generating metadata that identifies cross fade points for the content in response to receiving input from a user that defines desired crossfade points for the content at 604. In accordance with at least one embodiment, each cross fade point may identify a time window of the content that can be utilized when interleaving the content with other content. In some embodiments, the input from the user device may also identify pitch and/or tempo input that can be utilized to further modify the crossfade that occurs when transitioning from the content to the other content. For example, the tempo input can be utilized by a user device or software application of the user device to speed up or slow down the content during a crossfade transition to provide a certain transition as desired by the user (i.e., for a faster transition with an increased tempo or a slower transition with a decreased tempo).

In accordance with at least one embodiment, the process 600 may include verifying the metadata for the content based at least in part on the first information at 606. In embodiments, the content curation service provider computers may perform a verification check of the metadata generated based on the user input to ensure that crossfades are not being attempted when particular types or portions of audio or video are presented in the content. For example, a cross fade point defined by a user to occur during a time window when lyrics are presented in a song may not pass verification as a resulting crossfade transition would result in a jarring and disruptive user experience. In accordance with at least one embodiment, the process 600 may conclude at 608 by transmitting the metadata to the user device in response to verifying the metadata. As described herein, the metadata generated by the input provided by the user may be offered or made available for transmitting to other users associated with the content curation service upon verification. In embodiments, a user may download the newly generated metadata for use by a playback application or corresponding user device to present a playlist in a new order and with new crossfade transitions as identified by the metadata. The user would not have to re-download the entire playlist worth of media files to utilize the metadata but instead would only be required to download the metadata for integration with the content. By only transferring the metadata in some examples the user's network resources are utilized in an efficient manner and new interpretations of the playlist can be enjoyed by the user faster.

Figure 7:
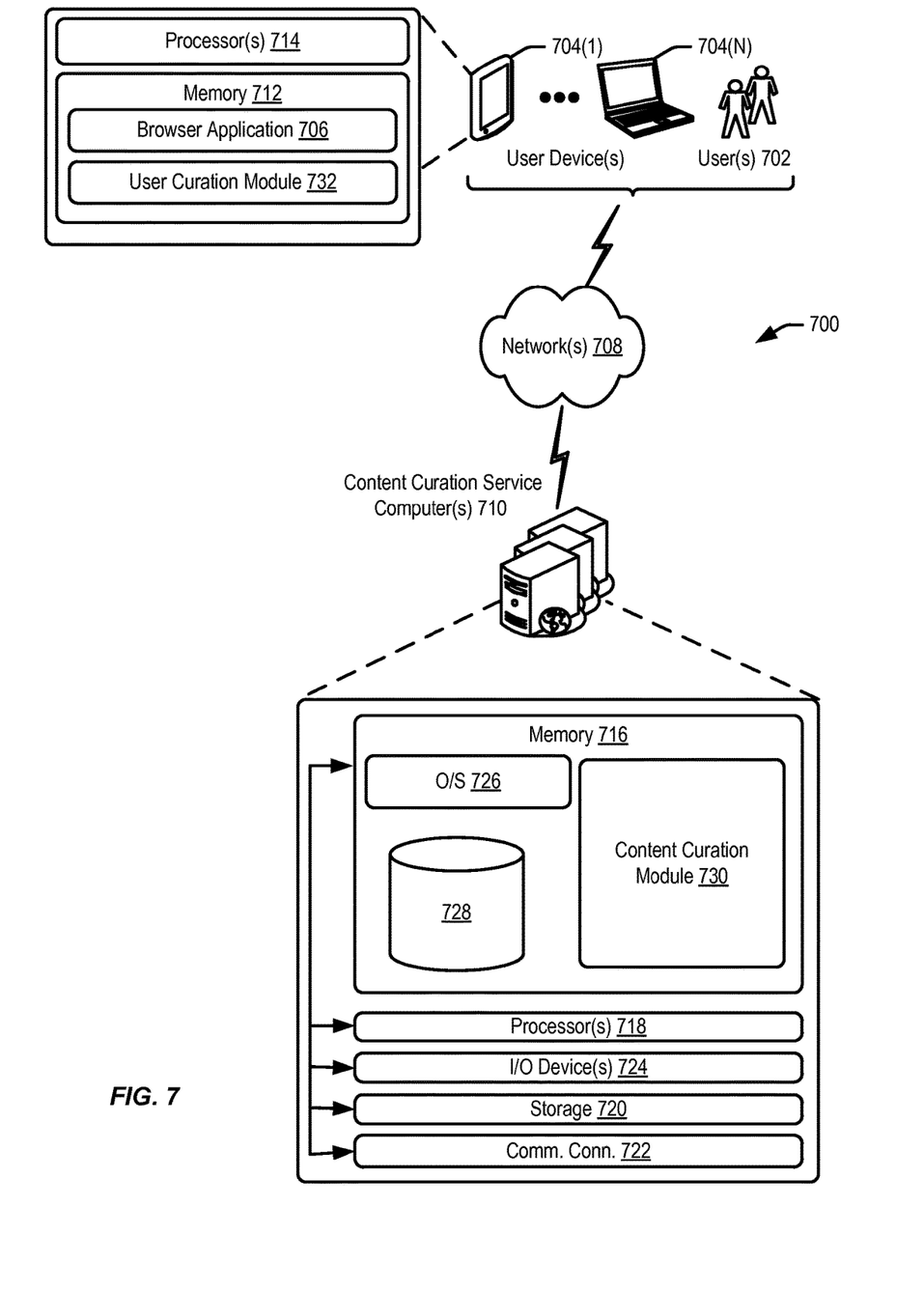
FIG. 7 illustrates an example architecture for a content curation features described herein that includes content curation service computers and user devices connected via one or more networks as described herein, in accordance with at least one embodiment.

FIG. 7 illustrates an example architecture for a content curation features described herein that includes content curation service computers and user devices connected via one or more networks as described herein, in accordance with at least one embodiment. In architecture 700, one or more users 702 (e.g., users) may utilize user computing devices 704(1)-(N) (collectively, user devices 704) to access a browser application 706 (e.g., a network document browser) or a user interface (UI) accessible through the browser application 706, via one or more networks 708 to provide input or select metadata and corresponding content for content curation features, as described herein. The "browser application" 706 can be any browser control or native application that can access and display a web page, user interface, or other information. In some aspects, the browser application 706 may display an interactive UI for interacting with content, providing input about content, providing input utilized to generate metadata, or selecting profiles, tempo, or pitch updates that are provided/presented by an content providing entity associated with content curation features as described herein.

The architecture 700 may also include, one or more content curation service provider computers 710 that may, in some examples, provide computing resources such as, but not limited to, client entities, low latency data storage, durable data storage, data access, management, virtualization, hosted computing environment or "cloud-based" solutions, electronic content performance management, etc. The one or more content curation service provider computers 710 may also be operable to provide site hosting, computer application development, and/or implementation platforms, combinations of the foregoing, or the like to the one or more users 702.

In one illustrative configuration, the user computing devices 704 may include at least one memory 712 and one or more processing units or processor(s) 714. The processor(s) 714 may be implemented as appropriate in hardware, computer-executable instructions, firmware, or combinations thereof. Computer-executable instruction or firmware implementations of the processor(s) 714 may include computer-executable or machine-executable instructions written in any suitable programming language to perform the various functions described herein. The user devices 704 may also include geo-location devices (e.g., a global positioning system (GPS) device or the like) for providing and/or recording geographic location information associated with the user devices 704. The memory 712 may store program instructions that are loadable and executable on the processor(s) 714, as well as data generated during the execution of these programs. Depending on the configuration and type of user device 704, the memory 712 may be volatile (such as random access memory (RAM)) and/or non-volatile (such as read-only memory (ROM), flash memory, etc.). The user device 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 712 may include multiple different types of memory, such as static random access memory (SRAM), dynamic random access memory (DRAM), or ROM.

Turning to the components of the memory 712 in more detail, the memory 712 may include an operating system and one or more application programs or services for implementing the features disclosed herein including interacting with content, providing input about content, providing input utilized to generate metadata, or selecting profiles, tempo, or pitch updates that have been generated and provided by the content curation service provider computers 710 to the user 702 via the browser application 706, dedicated applications (e.g., smart phone applications, tablet applications, etc.), or through capabilities inherit to a device (e.g., user interfaces or touch input interfaces). Additionally, the memory 712 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 702 provided response to a security question or a geographic location obtained by the user device 704.

In some examples, the networks 708 may include any one or a combination of many different types of networks, such as cable networks, the Internet, wireless networks, cellular networks and other private and/or public networks. While the illustrated example represents the users 702 communicating with the content curation service provider computers 710 over the networks 708, the described techniques may equally apply in instances where the users 702 interact with the one or more content curation service provider computers 710 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The browser application 706 may be capable of handling requests from many users 702 and serving, in response, various user interfaces that can be rendered at the user devices 704 such as, but not limited to, a network site or web page. The browser application 706 can interact with any type of network site that supports user interaction, including social networking sites, electronic retailers, informational sites, blog sites, search engine sites, news and entertainment sites, electronic marketplaces, content providers, and so forth. The described techniques can similarly be implemented outside of the browser application 706, such as with other applications running on the user device 704.

The one or more content curation service provider computers 710 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more content curation service provider computers 710 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more content curation service provider computers 710 may be in communication with the user device 704 via the networks 708, or via other network connections. The one or more content curation service provider computers 710 may include one or more servers, perhaps arranged in a cluster or as individual servers not associated with one another.

In one illustrative configuration, the one or more content curation service provider computers 710 may include at least one memory 716 and one or more processing units or processors(s) 718. The processor(s) 718 may be implemented as appropriate in hardware, computer-executable instructions, firmware, or combinations thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more content curation service provider computers 710, the memory 716 may be volatile (such as RAM) and/or non-volatile (such as ROM, flash memory, etc.). The one or more content curation service provider computers 710 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more content curation service provider computers 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more content curation service provider computers 710. Combinations of any of the above should also be included within the scope of non-transitory computer-readable media.

The one or more content curation service provider computers 710 may also contain communication connection interface(s) 722 that allow the one or more service provider computers 710 to communicate with a data store, another computing device or server, user terminals and/or other devices on the networks 708. The one or more content curation service provider computers 710 may also include I/O device(s) 724, such as a keyboard, a mouse, a pen, a voice input device, a touch input device, a display, speakers, a printer, etc.

Turning to the contents of the memory 716 in more detail and as was described above in further detail in FIG. 4, the memory 716 may include an operating system 726, one or more data stores 728, and/or one or more application programs or services for implementing the features disclosed herein including a content curation module 730 (which may be an example of content curation module 400). In accordance with at least one embodiment, the content curation module 730 may be configured to at least maintain first information identifying portions of content that lack audio or video data, maintain metadata identifying a plurality of cross fade points for seamless playback and integration in a playlist or mix configuration for pieces of content, generating new metadata based on user input, verifying metadata for a particular playlist or mix of content based on a set of rules and/or policies, generating content snippets for interleaving into a mix or playlist of content, and transmitting content, playlists, mixes, and metadata to a user device of a user, as described herein.

Turning to the contents of the memory 712 in more detail, the memory 712 may include one or more application programs or services for implementing the features disclosed herein including a user curation module 732 (which may be an example of and implement the same functionality of content curation module 400). In accordance with at least one embodiment, the user curation module 732 may be configured to obtain or record, via the user device 704, tempo and pitch modifications captured from incoming audio streams. The user curation module 732 may be configured to playback and tempo, pitch, volume, gain, or other suitable modifications during transitions as indicated by metadata for content as described herein.

Figure 8:
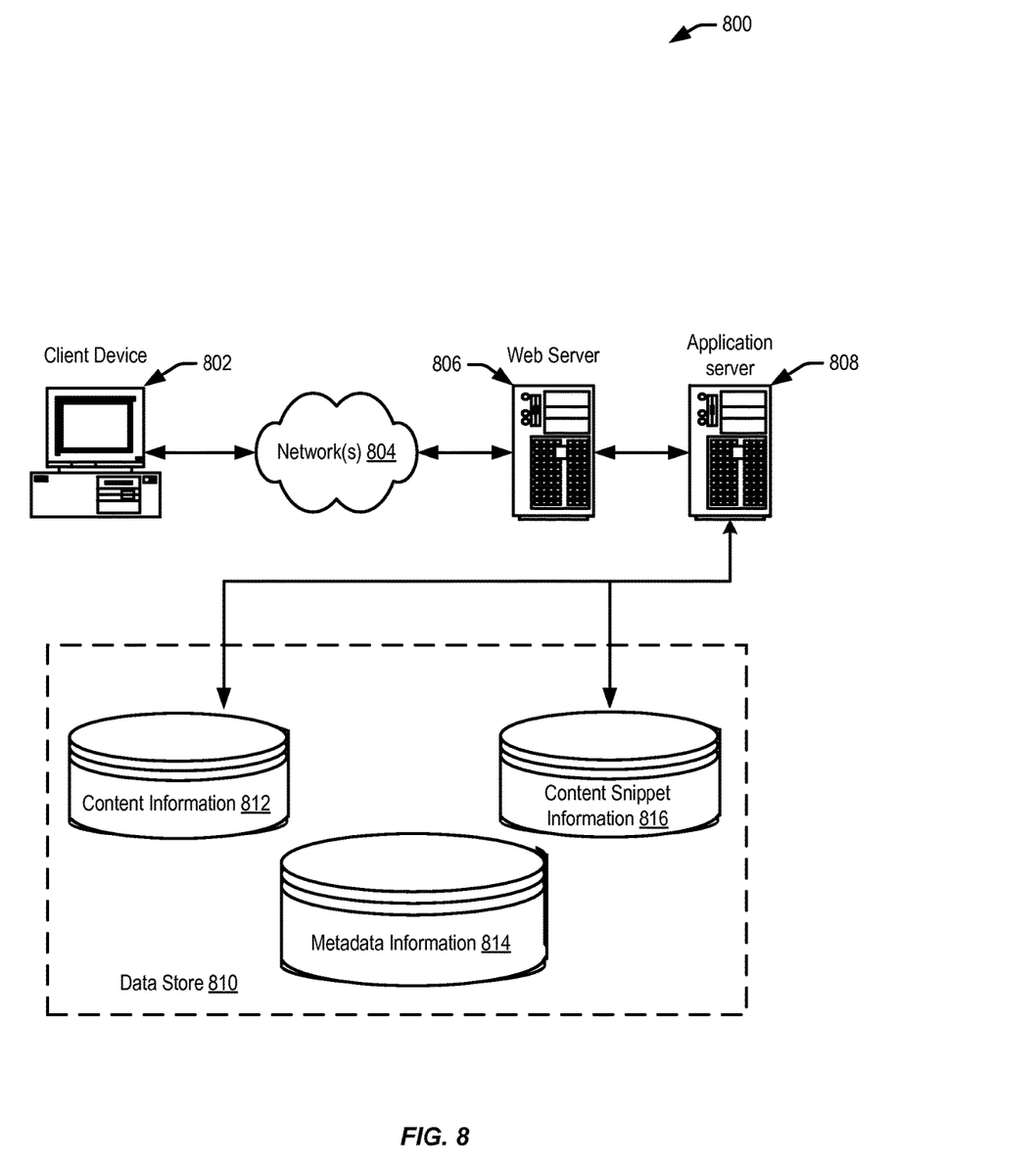
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content information 812 and content snippet information 816, which can be used to serve content for the production side. The data store also is shown to include a mechanism for storing metadata information 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    maintaining, by a computer system, first information for a plurality of songs that identifies, for each song, one or more time windows where no verbal lyrics are present in the song based at least in part on time encoding information associated with each song;
    receiving, by the computer system, input from a user device of a user identifying a playlist comprising a portion of songs of the plurality of songs;
    generating, by the computer system, metadata for the playlist that identifies a plurality of cross fade points for a song of the portion of songs based at least in part on the first information, each of the plurality of cross fade points configured for seamless playback, by the user device, between a first song of the playlist and a second song of the playlist, the second song immediately following the first song, the seamless playback comprising fading out of the first song at a point in the first song where verbal lyrics are not present as indicated by the first information and fading in of the second song at a point in the second song where verbal lyrics are not present as indicated by the first information;
    determining, by the computer system, that the metadata adheres to a set of rules for the portion of songs, the set of rules identifying time windows prohibiting application of the plurality of cross fade points for certain types of audio or portions of audio for an individual song of the portion of the songs for the seamless playback; and
    transmitting, by the computer system, the metadata to the user device in response to determining that the metadata adheres to the set of rules for the portion of songs.

2. The computer-implemented method of claim 1, wherein the first information for each of the plurality of songs further identifies a plurality of time windows for the respective song where no audio is present.

3. The computer-implemented method of claim 1, wherein the metadata is generated by an entity associated with a provider of the plurality of songs, and wherein the seamless playback is further comprised of a different duration based at least in part on the first information.

4. The computer-implemented method of claim 1, further comprising transmitting, by the computer system, instructions to the user device enabling the seamless playback between each transition of songs of the playlist utilizing the metadata.

5. The computer-implemented method of claim 4, wherein the metadata further identifies a particular song for removal from the playlist or reordering the portion of songs for the playlist.

6. A computer-implemented method, comprising:
maintaining, by a computer system, first information for content that identifies one or more portions of the content without audio or video data based at least in part on time encoding information associated with the content;
in response to receiving, by the computer system, input from a user device of a user that defines desired cross fade points for the content, each cross fade point identifying a time window of the content for interleaving with other content:
generating, by the computer system, and based at least in part on the input, metadata for identifying the cross fade points for the content;
verifying, by the computer system, the metadata for the content utilizing the first information to verify that the interleaving of the content with the other content occurs during the one or more portions of the content without audio or video data;
determining, by the computer system, that the metadata adheres to a set of rules for the content, the set of rules identifying time windows prohibiting application of the interleaving of the content with the other content for certain types of content or for the one or more portions of the content;
transmitting, by the computer system, the metadata to the user device in response to verifying the metadata for the content and determining the metadata adheres to the set of rules for the content.

7. The computer-implemented method of claim 6, wherein interleaving the content with the other content includes utilizing one or more playback applications for seamless presentation.

8. The computer-implemented method of claim 6, further comprising providing, by the computer system, a user interface for presenting the metadata from a plurality of metadata options, wherein receiving the input is further received via the user interface of the user device.

9. The computer-implemented method of claim 6, further comprising transmitting, by the computer system, one or more cross fade profiles based at least in part on the input from the user device, the one or more cross fade profiles configured to modify the cross fade points for the content when presenting the content, by the user device, to the user.

10. The computer-implemented method of claim 6, further comprising receiving, by the computer system, tempo input from the user device for modifying a tempo of the content during interleaving of the content with the other content.

11. The computer-implemented method of claim 10, wherein transmitting the metadata includes transmitting the tempo input for the content.

12. A system comprising:
a processor; and
a memory including instructions that, when executed by the processor, case the system to, at least:
maintain first information for a plurality of songs that identifies, for each song, one or more time windows where no verbal lyrics are present in the song based at least in part on time encoding information associated with each song;
receive input from a user device of a user identifying a playlist comprising a portion of songs of the plurality of songs;
generate metadata for the playlist that identifies a plurality of cross fade points for a song of the portion of songs based at least in part on the first information, each of the plurality of cross fade points configured for seamless playback, by the user device, between a first song of the playlist and a second song of the playlist, the second song immediately following the first song, the seamless playback comprising fading out of the first song at a point in the first song where verbal lyrics are not present as indicated by the first information and fading in of the second song at a point in the second song where verbal lyrics are not present as indicated by the first information;
determine that the metadata adheres to a set of rules for the portion of songs, the set of rules identifying time windows prohibiting application of the plurality of cross fade points for certain types of audio or portions of audio for an individual song of the portion of songs for the seamless playback; and
transmit the metadata to the user device in response to determining that the metadata adheres to the set of rules for the portion of songs.

13. The system of claim 12, wherein the first information for each of the plurality of songs further identifies a plurality of time windows for the respective song where no audio is present.

14. The system of claim 12, wherein the metadata is generated by an entity associated with a provider of the plurality of songs, and wherein the seamless playback is further comprised of a different duration based at least in part on the first information.

15. The system of claim 12, wherein the instructions when executed by the processor further cause the system to transmit instructions to the user device enabling the seamless playback between each transition of songs of the playlist utilizing the metadata.

16. The system of claim 15, wherein the metadata further identifies a particular song for removal from the playlist or reordering the portion of songs for the playlist.

17. The system of claim 15, wherein enabling seamless playback includes using one or more playback applications of the user device.

18. The system of claim 12, wherein the instructions when executed by the processor further cause the system to receive tempo input from the user device for modifying a tempo of the playlist.

19. The system of claim 18, wherein transmitting the metadata includes transmitting the tempo input for the playlist.

* * * * *